United States Patent
Hidaka

[11] Patent Number: 6,093,907
[45] Date of Patent: Jul. 25, 2000

[54] CONTACT TIP FOR WELDING

[75] Inventor: Masato Hidaka, Tsukui-gun, Japan

[73] Assignee: Kabushiki Kaisha SMK, Kanagawa, Japan

[21] Appl. No.: 09/051,245
[22] PCT Filed: Sep. 26, 1996
[86] PCT No.: PCT/JP96/02777
§ 371 Date: Apr. 3, 1998
§ 102(e) Date: Apr. 3, 1998
[87] PCT Pub. No.: WO97/12715
PCT Pub. Date: Apr. 10, 1997

[30] Foreign Application Priority Data

Oct. 3, 1995 [JP] Japan ................................. 7-279773

[51] Int. Cl.[7] ............................................... B23K 9/24
[52] U.S. Cl. ............................................ 219/137.61
[58] Field of Search ........................ 219/137.61, 137.52

[56] References Cited

U.S. PATENT DOCUMENTS

| 2,735,920 | 2/1956 | Valliere | 219/137.61 |
| 3,502,841 | 3/1970 | Heer | 219/137.61 |
| 4,450,341 | 5/1984 | Dietrick et al. | 219/137.52 |
| 4,937,428 | 6/1990 | Yoshinaka et al. | 219/137.52 |
| 5,635,091 | 6/1997 | Hori et al. | 219/137.61 |

FOREIGN PATENT DOCUMENTS

| 0324088 | 7/1989 | European Pat. Off. . | |
| 58-116168 | 8/1983 | Japan | B23K 9/26 |
| 59-183985 | 10/1984 | Japan | B23K 9/26 |
| 60-20372 | 2/1985 | Japan | B23K 9/26 |
| 61-115683 | 6/1986 | Japan | B23K 9/26 |
| 61-122077 | 8/1986 | Japan | B23K 9/26 |
| 62-169774 | 10/1987 | Japan | B23K 9/26 |
| 63-188477 | 8/1988 | Japan | B23K 9/26 |
| 1-96272 | 6/1989 | Japan | B23K 9/26 |
| 5-261551 | 10/1993 | Japan | B23K 9/26 |
| 5-277742 | 10/1993 | Japan | B23K 9/26 |
| 6-650 | 1/1994 | Japan | B23K 9/26 |
| 6-285645 | 10/1994 | Japan | B23K 9/26 |
| 2201112 | 8/1988 | United Kingdom | 219/137.61 |

Primary Examiner—Clifford C. Shaw
Attorney, Agent, or Firm—Schwegman, Lundberg, Woessner & Kluth, P.A.

[57] ABSTRACT

Welding contact tip having a wire passage for a welding wire in a center thereof, comprising a tip body and a tip end which are detachable from each other by screw-in type or taper force-in type structure, the tip body being composed of brass, aluminum, chromate copper, zirconium copper, zirconium chromate copper or phosphor bronze, the tip end being composed of copper, chromate copper, zirconium chromate copper, zirconium copper, silver tungsten, copper tungsten, alumina dispersed copper, beryllium copper or nickel beryllium copper, for prolonging a service life of the contact tip and reducing the total production cost thereof. Particularly brass is suitable for the tip body and chromate copper or zirconium chromate copper is suitable for the tip end. The wire passage in the tip body has a diameter 1.03–1.50 times a wire diameter and the wire passage in the tip end has a diameter 1.03–1.25 times the wire diameter. Consequently, it is possible to secure smooth insertion of the wire and electric conduction and further prevent a deviation of arc welding position.

6 Claims, 3 Drawing Sheets

CONTACT TIP FOR WELDING

FIELD OF THE ART

This invention relates to improved contact tips for use in arc welding.

BACKGROUND OF THE ART

Welding contact tips for use in automatic arc welding or semi-automatic arc welding have a wire passage for feeding a welding wire which is formed in the center of a shaft-like member formed of usually copper alloy which is a conductive material. The welding wire is passed through the wire passage. Arc welding is conducted at an end of the welding wire which is being supplied.

Meanwhile, the front end of the welding contact tip is exposed to high temperatures at the time of arc welding, therefore it is seriously worn. Because the welding wire is supplied through the wire passage, a shape of the passage at a front opening portion is inclined to change from its original circular shape to an oval shape due to abrasion between the welding wire and the passage. If the shape of the front opening portion of the wire passage is deformed, supply of the welding wire to a welding portion becomes unstable. Consequently, the wire is deviated from its proper position so that favorable arc welding is disabled. Additionally, spatter or the like substance easily sticks to walls of the wire passage thereby making it difficult to conduct welding operation.

Thus, various technologies were proposed to solve the above problem since before. For example, as shown in Japanese Utility Model Laid-Open No.Sho60-20372 and Japanese Utility Model Laid-Open No.Sho62-169774, a ring made of abrasion resistant material is forced into or sealed into the front end of the welding contact tip subjected to severe wearing. Japanese Patent Laid-Open No.Sho61-115683 and Japanese Patent Laid-Open No.Sho63-188477 have disclosed technologies for covering a front end portion of the contact tip with ceramic cap. Japanese Patent Laid-Open No.Hei6-285645 has disclosed a technology of coating a surface of the contact tip with heat resistant resin. Japanese Patent Laid-Open No.Hei5-261551 has disclosed a technology in which the end portion of the contact tip is structured in double tubes while an inside wire passage portion is of ceramic tube. Japanese Patent Laid-Open No.Hei5-277742 and Japanese Patent Laid-Open No.Hei6-650 have disclosed technologies in which entire contact tip is constructed with double tubes.

The technologies of forcing or sealing the abrasion resistant material into the welding contact tip, disclosed in the Japanese Utility Model Laid-Open No.Sho60-20372 and Japanese Utility Model Laid-Open No.Sho62-169774 have such a problem that cracks, loosening or the like is likely to occur at a portion in which a ring is forced in or sealed in. Further those technologies take trouble in production and do not produce excellent production performance (accuracy). The technologies of covering the front end of the contact tip with ceramic cap disclosed in the Japanese Patent Laid-Open No.Sho61-115683 and Japanese Patent Laid-Open No.Sho63-188477 and the technology of coating the surface of the contact tip with heat resistant resin disclosed in Japanese Patent Laid-Open No.Hei6-285645 are effective for preventing spatter from being adhered to the contact tip surface to some extent, however are not capable of solving fundamental problems such as deformation of the wire passage and wearing, and are limited in terms of improvement of durability. Thus those technologies are not practically usable.

Further, the technologies of providing double tube structure to raise the durability of the wire passage disclosed in Japanese Patent Laid-Open No.Hei5-261551 and Japanese Patent Laid-Open No.Hei5-277742 have such a problem that production methods are complicated and take troubles thereby increasing production cost. Thus, these technologies have not been realized for actual application.

DISCLOSURE OF THE INVENTION

Accordingly, an object of the present invention is to solve the above problems and provide such contact tips which facilitate production thereof and enable production thereof at low cost and which have excellent durability.

According to one aspect of the present invention, there is provided welding contact tips comprising a tip body and a tip end which are detachable from each other by screw-in type or taper force-in type structure, the tip body being composed of brass, aluminum, chromate copper, zirconium copper, zirconium chromate copper or phosphor bronze, the wire passage in the tip body having a diameter 1.03–1.50 times a wire diameter, the wire passage in the tip end having a diameter 1.03–1.25 times the wire diameter.

Here, the present invention has been proposed on a thought that total production cost can be reduced by ① constructing the contact tip with the tip body and the tip end separately and ② composing the tip body of brass, aluminum, chromate copper, zirconium copper, zirconium chromate copper, or phosphor bronze.

Total cost of consumption parts such as the welding contact tip is determined by not only production unit price but also durability (replacement frequency). For example, if the replacement frequency is decreased, if the durability is improved, the total cost decreases even if the unit price is reasonably higher. The welding contact tip according to the present invention is capable of increasing the durability more than twice and decreasing the production cost, so that tremendous reduction of the total cost can be achieved.

Effects of this cost reduction can be recognized conspicuously when soft material such as brass, aluminum is applied to the tip body which is larger than the tip end. Consequently, material cost can be reduced. Further, because drilling work and the like can be conducted easily, cost required for processing can be reduced. If soft material is utilized to make a hole to form a relatively long wire passage, accuracy in processing is better as compared with a case in which hard material is utilized. Further use of soft material enables to guide the wire smoothly, thereby making effects in reduction of wearing (to improve the durability).

The reason why the wire passage diameter of the tip body is set to be 1.03–1.50 times the wire diameter is as follows. If the wire passage diameter is less than 1.03, the wire is difficult to pass through the passage. If it is more than 1.50, electric conduction is deteriorated. Further, if a gap between the wire and the passage is too large, conversely contact between the wire and the passage does not become smooth, so that wearing is considered to become severe.

If the wire passage diameter of the tip end is set to be 1.03–1.25 times the wire diameter, electric conduction is secured and at the same time, the wire can be passed through smoothly. Further, it is possible to suppress deviation of the welding point which may occur if the wire passage is too large.

Because the tip body and the tip end are detachable from each other by the screw-in type or taper force-in type structure, if the tip end subjected to severe wearing by heat is worn, only the tip end can be replaced thereby securing a high operation efficiency.

According to another aspect of the present invention, there is provided welding contact tips wherein the tip end is composed of copper, chromate copper, zirconium chromate copper, zirconium copper, silver tungsten, copper tungsten, alumina dispersed copper, beryllium copper or nickel beryllium copper.

Because the tip end is composed of such material, wearing resistance of the tip end can be improved. If hard material is applied to only the relatively small tip end, material cost can be suppressed and further processing cost can be suppressed. Further, because the wire passage is short, even hard material can secure a high accuracy in drilling so that abrasion resistance caused when the wire passes through can be reduced.

According to further aspect of the present invention, there is provided welding contact tips wherein the wire passage of the tip end is 3–20 mm long.

In a case when the tip end is composed of hard material, if the length of the wire passage is more than 20 mm, accurate drilling becomes difficult so that abrasion resistance relative to the wire is inclined to increase. If the length of the wire passage is less than 3 mm, the actual length of the tip end decreases. Thus, thermal influences at the time of welding easily reach the tip body and further the tip end is subjected to serious wearing by heat and ease of the handling of this component is eliminated. That is, this too short length is not favorable.

According to still further aspect of the present invention, there is provided welding contact tips wherein an expanded taper portion which is open with a passage area gradually expanding is formed at an opening portion on a proximal side of the wire passage of the tip end.

If the expanded taper portion is formed, this effectively prevents the wire from being caught and fixed when the wire is supplied from the wire passage in the tip body to the wire passage in the tip end.

According to yet still further aspect of the present invention, there is provided welding contact tips wherein a rear end of the tip end and a front end of the tip body have each screw portion and each contact face except the screw portion, which is in contact with each other, the contact faces having a contact area which is more than 10% the rear face of the tip end or the front face of the tip body.

If the contact area is less than 10%, heat conduction between the tip body and the tip end is deteriorated so that cooling effect of the tip end at the time of welding is reduced and electric conduction is badly affected.

According to yet still further aspect of the present invention, there is provided welding contact tips wherein round portion is formed on a periphery of the end face of the tip end.

This round portion makes it difficult for spatter or the like generated at the time of welding to stick to the tip end.

According to yet still further aspect of the present invention, there is provided welding contact tips wherein punch marks are provided on the end face of the tip end.

If punch marks are provided on the end face of the tip end, if the tip end is set up for forming, it is possible to make punch marks at the same time as the setting up, thereby eliminating particular punch mark procedures.

BEST MODE FOR CARRYING OUT THE INVENTION

Embodiments of the present invention will be described with reference to the accompanying drawings.

Figure 1:
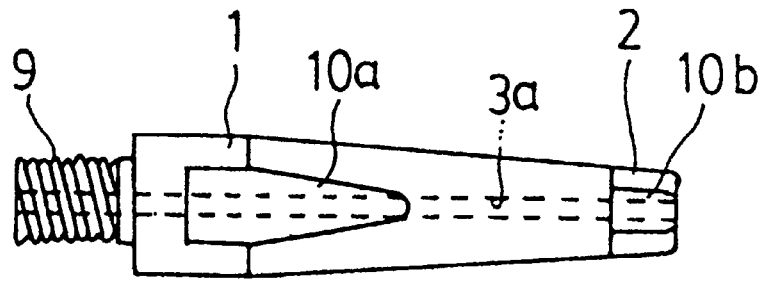
FIG. 1 is a front view of a welding contact tip according to the present invention.

As shown in FIG. 1, a welding contact tip according to the present invention comprises a tip body 1 and a tip end 2. The welding contact tip is composed by connecting the tip body 1 and the tip end 2 so that they are integrated with each other. Only the tip end 2 which is subjected to serious wearing caused by automatic arc welding or semi-automatic arc welding can be replaced with another one.

Figure 2:
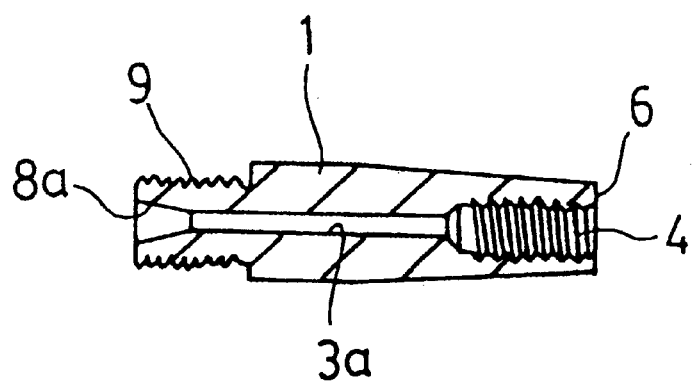
FIG. 2 is a sectional view of a tip body.

As shown in FIG. 2, the tip body 1 is relatively large, shaft-like part having a wire passage 3a along its axis. A screw hole 4 communicating with the wire passage 3a is formed in the center of the front portion of the tip body 1. On the rear side of the tip body 1, a mounting portion 9 which is a male screw portion is formed so as to mount the welding contact tip onto a torch (not shown).

Figure 3:
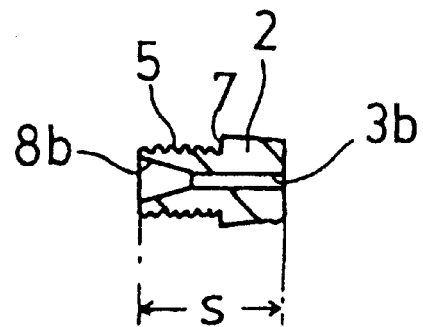
FIG. 3 is a sectional view of a tip end.
Figure 4:
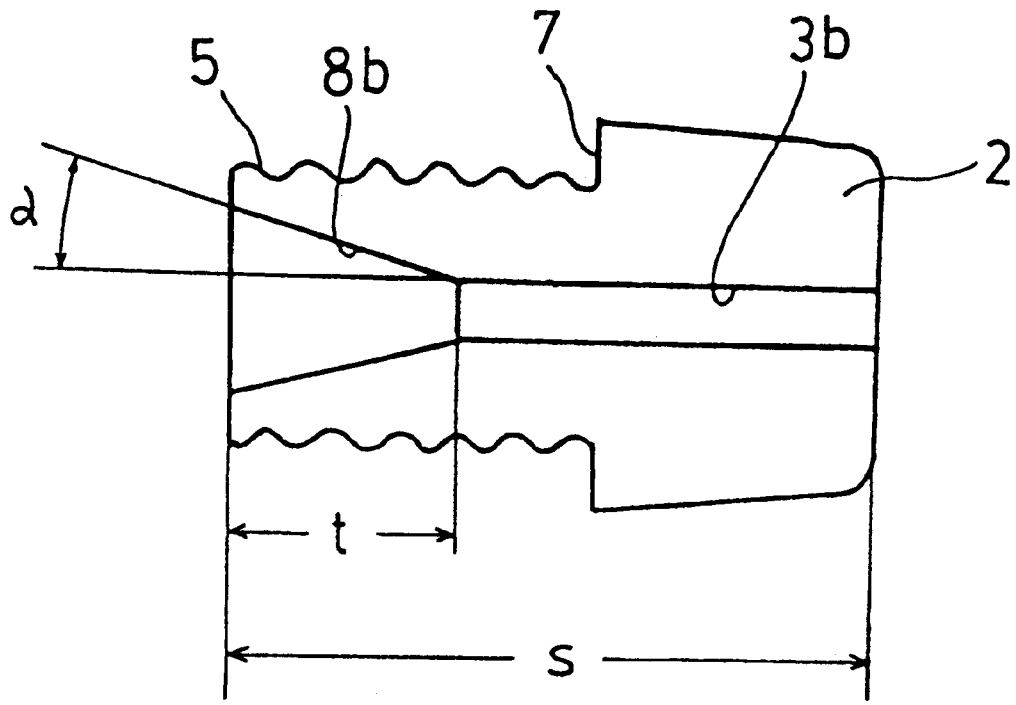
FIG. 4 is an enlarged view of FIG. 3.
Figure 5:
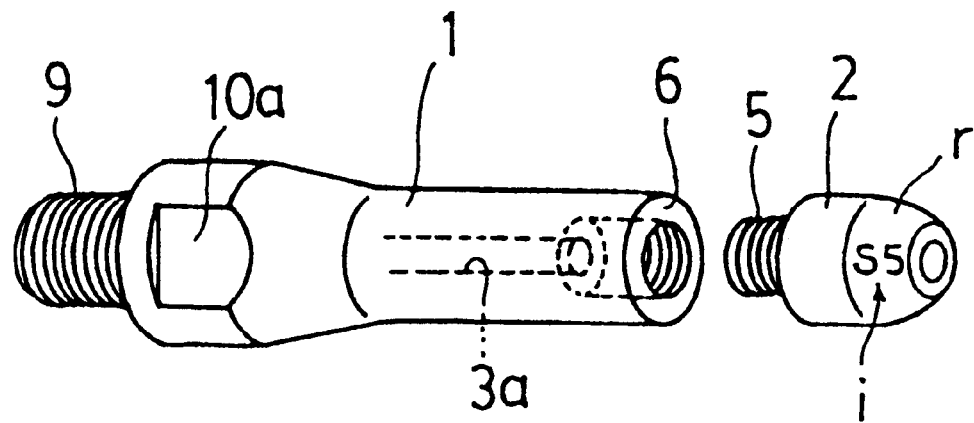
FIG. 5 is an entire perspective view showing an example of structure in which round portion is formed on a front end face of the tip end.

As shown in FIG. 3, the tip end 2 is a relatively small part provided with a male screw portion 5 which protrudes from aback face thereof backward. A wire passage 3b is formed along its axis and the male screw portion protruding from the back face can be engaged with the screw hole 4 on a front end face of the tip body 1.

Figure 6:
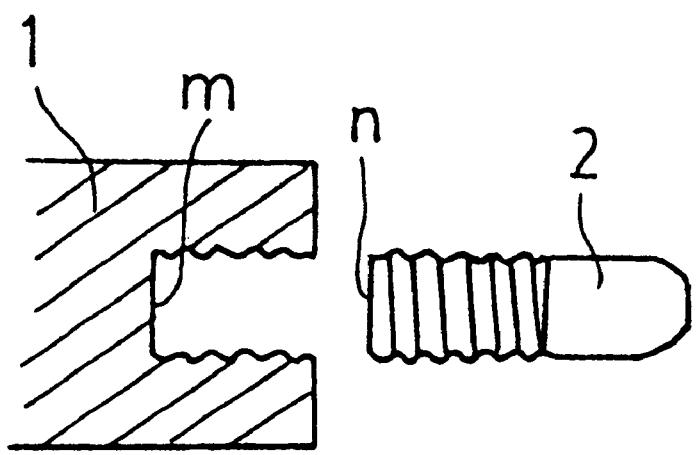
FIG. 6 is an explanatory view showing an example of structure in which contact faces are formed on a bottom face of a screw hole and an end face of a male screw portion.

Then if the screw portion 5 of the tip end 2 is driven into the screw portion 4 of the tip body 1, the tip body 1 is connected with the tip end 2 such that a contact face 6 on a front side of the tip body 1 comes into a contact with a contact face 7 on a rear side of the tip end 2. Consequently, heat conduction and electric conduction between the tip body 1 and the tip end 2 are secured through these contact faces 6, 7. The contact face 6 of the tip body 1 is a portion of the front face portion of the tip body excluding a portion of the screw hole 4. The contact face 7 of the tip end 2 is a portion of the rear face portion of the tip end 2 excluding a portion of the male screw portion 2. Assuming that a hole bottom face of the screw hole 4 of the tip body 1 is m and the rear end face of the male screw portion 5 of the tip end 2 is n, it is permissible to construct so that the hole bottom face m fits to the rear end face n as shown in FIG. 6 when the contact faces 6, 7 are connected with each other by engaging the male screw portion 5. Then to secure sufficient heat conduction and electric conduction, the contact faces 6 (or m), 7 (or n) are constructed to have area more than 10% those of the front face of the tip body 1 and the rear face of the tip end 2 respectively.

Figure 7:
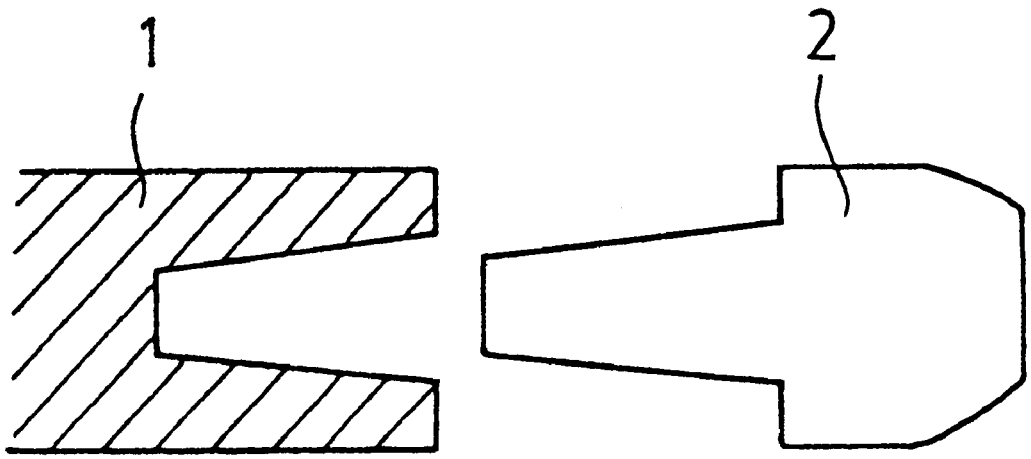
FIG. 7 is an explanatory view showing an example of structure in which the tip body is engaged with the tip end by taper force-in method.

The female screw of the tip body 1 and the male screw of the tip end 2 may be reversed. Further, engagement method between both the components may be taper force-in type as shown in FIG. 7 instead of the screw-in type.

In the case of the screw type shown in FIGS. 1–5, when the male screw portion 5 of the tip end 2 is forced into the screw hole 4 in the tip body 1, both the wire passages 3a, 3b can be aligned accurately. Thus, the welding wire can be fed smoothly through the wire passages 3a, 3b. On a rear side of the wire passage 3b of the tip end 2, an expanded taper portion 8b which is open backward with its passage area expanding is formed. Also, on a rear side of the wire passage 3a of the tip body 1, an expanded taper portion 8a which is open backward with its passage area expanding is formed. Consequently, when the wire is passed from the rear end of the tip body 1, a front end of the wire can be fed smoothly through the same portions.

Flat portions 10a, 10b for insertion into a tightening tool are formed on surfaces of the tip body 1 and tip end 2 respectively such that the tip body 1 and the tip end 2 can be driven into each screw-in portion securely. Then, the flat portions 10a, 10b can be nipped by a wrench or the like such that the tip body 1 and the tip end 2 can be tightened securely.

According to the present invention, the tip body 1 is made of brass, copper, aluminum, chromate copper, zirconium copper, zirconium chromate copper or phosphor bronze. The tip end 2 is made of copper, chromate copper, zirconium chromate copper, zirconium copper, silver tungsten, copper tungsten, alumina dispersed copper, beryllium copper, or nickel beryllium copper.

These are combination of the materials effective for reduction of total cost in terms of relation between durability and production cost, which are provided as a result of repeated experiment with various materials by this inventor. Table 1 shows a result of durability test and a relation with prices from viewpoint of comparison with conventional integrated type welding contact tip.

TABLE 1

(Extraction of a result of durability test with various material)

| | Tip body | | | | | Tip end | | | | |
|---|---|---|---|---|---|---|---|---|---|---|
| Shape | Material | Durable days | Unit price | Unit price per day | Evaluation | Material | Durable days | Unit price | Unit price per day | Evaluation |
| Separation type | Brass | 15 | 300 | 20 | ○ | Chromate copper | 3 | 100 | 34 | ○ |
| | Aluminum | 12 | 350 | 30 | ○ | Copper | 1 | 100 | 100 | Δ |
| | Copper | 13 | 400 | 31 | ○ | Aluminum | 0.5 | 100 | 200 | X |
| | Zirconium chromate copper | 15 | 500 | 34 | ○ | Zirconium chromate copper | 3.5 | 120 | 35 | ○ |
| | Chromate copper | 15 | 400 | 27 | ○ | Brass | 0.5 | 50 | 100 | X |
| | Phosphor bronze | 16 | 550 | 35 | ○ | Silver tungsten | 6 | 600 | 100 | Δ |
| | Zirconium copper | 14 | 600 | 43 | ○ | Copper tungsten | 5 | 500 | 100 | Δ |
| | | | | | | Alumina dispersed copper | 3.5 | 300 | 86 | ○ |
| | | | | | | Nickel beryllium copper | 5 | 400 | 80 | ○ |
| | | | | | | Zirconium Copper | 2.5 | 150 | 60 | ○ |
| Integrated type | Chromate copper | | | | | | | | 120 | |
| | Zirconium chromate copper | | | | | | | | 150 | |

Notes with respect to Table 1
Note 1: If the tip end is copper, silver tungsten, or copper tungsten, almost the same unit price as conventionally can be obtained by making by the top body of brass.
Note 2: If the tip end is brass, almost the same unit price as conventionally can be obtained by making the tip body of brass. However, the durable days are shorter. So it is not practical.

Day-basis unit price (obtained by dividing unit price by durable days) is obtained from durable days obtained from a result of the durability test and a relation between the tip body 1 and the tip end 2. In the case of conventional integrated type contact tip, it costs about JP¥120 in case of chromate copper and about JP¥150 in case of zirconium chromate copper. If the separation type is used as mentioned in this invention, total cost of the tip body 1 and the tip end 2 can be equal to or lower than about JP¥120 which is cost of the conventional integrated type.

Of them, a particularly effective combination is that the tip body 1 is brass and the tip end 2 is chromate copper or zirconium chromate copper. In this case, the day-basis unit price is JP¥54-55 which is cost reduction more than twice conventional price.

The diameter of the wire passage 3a in the chip body 1 is 1.03–1.50 times the wire diameter and the diameter of the wire passage 3b in the chip end 2 is 1.03–1.25 times the wire diameter.

This is what has been made evident by this inventor as a result of experiments on various combination of the wire diameter of the tip body 1 and the wire diameter of the tip end 2. Table 2 shows an extraction of this result of the experiment.

occur. If it is more than 10%, such defects do not occur. The relation of the contact area in the contact face 6(m) of the tip body 1 is the same for the tip end 2. The area of the contact face (n in FIG. 6) on the front side of the tip end 7 is more than 10% the entire area of the front face of the tip end 2.

A shape of the front end of the tip end 2 may be flat as shown in FIG. 3, however, it is more favorable if round portion r is provided on the entire range. This round portion r provided around the front end repels spatter generated in

TABLE 2

(Extraction of a result of wire passage test)

| Wire passage diameter of tip body relative to wire diameter | Wire passage diameter of tip end relative to wire diameter | Evaluation | Remark |
|---|---|---|---|
| 1.02 | 1.02 | X | Wire feeding is difficult |
| 1.02 | 1.03 | X | Wire feeding is difficult |
| 1.02 | 1.06 | X | Wire feeding is difficult |
| 1.03 | 1.02 | X | Wire feeding is difficult |
| 1.03 | 1.03 | ○ | |
| 1.03 | 1.06 | ○ | |
| 1.05 | 1.02 | X | Wire feeding is difficult |
| 1.05 | 1.03 | ○ | |
| 1.05 | 1.08 | ○ | |
| 1.15 | 1.15 | ○ | |
| 1.15 | 1.25 | ○ | |
| 1.15 | 1.27 | X | Welding position deviation |
| 1.30 | 1.15 | ○ | |
| 1.30 | 1.25 | ○ | |
| 1.30 | 1.27 | X | Electric conduction is unstable |
| 1.50 | 1.10 | ○ | |
| 1.50 | 1.25 | ○ | |
| 1.50 | 1.27 | X | Welding position deviation |
| 1.51 | 1.10 | X | Electric conduction is unstable |
| 1.51 | 1.25 | X | Electric conduction is unstable |
| 1.51 | 1.27 | X | Electric conduction is unstable |
| 1.55 | 1.12 | X | Electric conduction is unstable |
| 1.55 | 1.27 | X | Electric conduction is unstable |

Consequently, if the wire passage diameter of the chip body 1 is less than 1.03 times the wire diameter, the wire is difficult to feed. If it is less than 1.50 times the wire diameter, sufficient electric conduction cannot be secured thereby providing an unfavorable condition. Further, if the wire passage diameter of the tip end is less than 1.03 times the wire diameter, the wire is difficult to feed through. If it is more than 1.25 times, a deviation of welding point is likely to occur so that it becomes impossible to conduct accurate welding.

With respect to the wire passage diameter enabling the most stable welding, the wire passage diameter of the tip body 1 is within a range of 1.05–1.30 times the wire diameter and the wire passage diameter of the tip end 2 is within a range of 1.05–1.15 times the wire diameter.

The wire passage length s of the tip end 2 is 3–20 mm.

This reason is as follows. If the length of the tip end 2 is less than 3 mm, such defect as wearing, fusion and the like becomes more likely to spread into the wire passage 3 of the tip body 1. Further, if the length of the tip end 2 is shorter, processing performance and handling performance become down. If the length of the wire passage 3b is more than 20 mm, it is difficult to secure accuracy in processing of the wire passage 3b. Further, the tip end 2 becomes large, so that cost performance is reduced. As described above, the area of the contact face 6 (area m in FIG. 6) on the front side of the tip body 1 is more than 10% the total area of the front face of the tip body 1. If it is less than 10%, heat conduction is deteriorated so that cooling of the tip end 2 is not performed smoothly. Further, improper electric conduction is likely to welding and makes it difficult for spatter to stick thereto. Consequently, reduction of welding quality due to disturbance of gas flow is suppressed.

To prevent adhesion of the spatter, it is permissible to plate the exterior surface of the tip end 2 with nickel, hard chrome or the like.

Further, it is permissible to provide the end face with punch marks. This punch mark i includes for example, producer name, production number, product number and the like. If the punch mark i is to be provided on the end face, it may be provided at the same time as when the tip end 2 is set up for following processing. Thus, a particular process for providing punch marks as seen in conventional products can be omitted, thereby simplifying the processing operation, which leads to reduction of production cost.

The external shapes of the tip body 1 and the tip end 2 may be circular in cross section, dodecagon, hexagon, tetragon, pentagon, width across flats or the like.

INDUSTRIAL APPLICABILITY

The welding contact tip improves the durability of the arc welding contact tip and welding quality produced therewith, thereby largely reducing total cost of welding operation.

What is claimed is:

1. Welding contact tip having a wire passage for a welding wire in a center thereof, comprising a tip body and a tip end which are detachable from each other by screw-in type or taper force-in type structure, wherein an expanded taper portion which is open with a passage area expanding is formed at an opening portion on a proximal side of the wire passage of said tip end, a rear end of said tip end and a front end of said tip body have each screw portion and each contact face except the screw portion, which is in contact with each other, said contact face having a contact area which is more than 10% the rear face of said tip end or the front face of said tip body, said wire passage in said tip body having a diameter 1.03–1.50 times a wire diameter, said wire passage in said tip end having a diameter 1.03–1.25 times the wire diameter.

2. Welding contact tip according to claim 1 wherein said tip body is composed of brass, aluminum, chromate copper, zirconium copper, zirconium chromate copper or phosphor bronze and said tip end is composed of copper, chromate copper, zirconium chromate copper, zirconium copper, silver tungsten, copper tungsten, alumina dispersed copper, beryllium copper or nickel beryllium copper.

3. Welding contact tip according to claim 1 wherein said wire passage of the tip end is 3–20 mm long.

4. Welding contact tip according to claim 1 wherein round portion is formed on a periphery of the end face of said tip end.

5. Welding contact tip according to claim 1 wherein punch marks are provided on the end face of said tip end.

6. Welding contact tip according to claim 1 wherein flat portions for insertion into tightening tool are formed on surface of the tip body and the tip end, respectively, such that the tip body and the tip end can be driven into each screw-in portion securely.

* * * * *